United States Patent Office 3,167,530
Patented Jan. 26, 1965

3,167,530
METHOD OF REACTING FORMALDEHYDE WITH AN AROMATIC HYDROCARBON
Judson E. Goodrich, San Rafael, Calif., assignor to California Research Corporation, San Francisco, Calif., a corporation of Delaware
No Drawing. Filed Feb. 10, 1961, Ser. No. 88,275
8 Claims. (Cl. 260—67)

This invention pertains to a particular form of formolite resins by which such resins become useful in industry. In particular, this invention is directed to formolite resins which can be used to thicken lubricating oils to a consistency of greases, to thicken paint compositions, to thicken ink compositions, and in general to thicken non-metallic substances which are liquid at room temperature.

This application is a continuation-in-part of U.S. patent application Serial No. 783,137, filed December 29, 1958, now abandoned.

The formolite resins described herein are obtained by the reaction of formaldehyde with aromatic hydrocarbons in the presence of certain acid catalysts. The overall general reaction of formaldehyde with aromatic hydrocarbons in the presence of acid catalyst is well described in the literature. The preparation of resins by the reaction of an aromatic compound (arene) with formaldehyde by the use of an acid catalyst was first described by Nastyukov in 1903; J. Russ. Phys. Chem. Soc., 35, 824 (1903); abstracted in J. Chem. Soc., 86, 242 (1904). Nastyukov labelled this reaction the "Formolite Reaction," and the products resulting therefrom are often called formolite resins. The literature states that the products obtained by such reactions include diphenylmethane and two types of resinous products. One of the resinous products is a high melting essentially oxygen free resin soluble in most organic solvents melting at about 200° F. The other resin product is an infusible resin insoluble in all common solvents, and containing a significant amount of oxygen.

The resin that predominates at elevated reaction temperatures in the formolite reaction is soluble in most organic solvents; it is thermoplastic; and it has a softening point up to about 285° F. This type of formolite resin, which is essentially oxygen free, is the subject of numerous patents describing various methods of manufacture and a number of uses therefor.

Although the literature describes both of these resins as formolite resins, the resin described in this invention is a new form of the infusible resin insoluble in all common solvents.

Up to the present time, the type of resin that predominates at ambient reaction temperatures has been of no value whatsoever to industry. This resin is infusible; it is insoluble in all common solvents; and it contains significant amounts of oxygen. In an effort to produce from this infusible formolite resin a resin which could be of use to industry, it was necessary to alter the form of the resin.

Therefore, it is a primary object of this invention to describe a modified form of infusible formolite resins which resin form makes the resin useful in commerce.

In accordance with this invention, it has been discovered that commercially valuable infusible formolite resins can be obtained by reacting an aromatic compound with formaldehyde, using an acid catalyst, in the presence of a dispersing agent. The new formolite resins thus obtained are termed "micro-dispersed, infusible resins."

The preparation of micro-dispersed infusible resins from readily available reagents provides a new type of material for commercial use.

The micro-dispersed infusible resins are prepared by slowly adding formaldehyde to a rapidly agitated mixture consisting of the aromatic compound, a solvent for the aromatic compound, a dispersant, and the acid catalyst.

The aromatic hydrocarbons used in the formation of the infusible resins described herein are aromatic hydrocarbons containing a benzene ring. Aromatic hydrocarbons particularly preferred are alkyl substituted benzene compounds containing no more than 2 alkyl radicals substituted on the benzene ring, each alkyl radical containing no more than 6 carbon atoms.

Included as aromatic hydrocarbons are those represented by the formula:

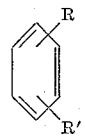

wherein R can be hydrogen or an alkyl radical containing no more than 6 carbon atoms, and R' can be hydrogen, an alkyl radical containing no more than 6 carbon atoms, a phenyl radical, or an alkylphenyl radical wherein the alkyl radical contains no more than 6 carbon atoms.

Aromatic hydrocarbon reactants are exemplified by benzene, n-butyl benzene, toluene, o-xylene, m-xylene, p-xylene, biphenyl, cumene, p-cymene, aromatic petroleum fractions, etc.

Formaldehyde is preferred as the aldehyde reactant; however, other compounds which yield formaldehyde under the condition of the reactant may be used, including paraformaldehyde, methylal, alpha-trioxymethylene, and metaformaldehyde, etc.

The mol ratio of aromatic hydrocarbons to formaldehyde may have values from 0.5 to about 4.0, preferably from about 0.5 to about 1.0.

If the formaldehyde is used in amounts of less than 1.5 mols of formaldehyde per mol of benzene, the yield of the desired resin is considerably decreased.

As acid catalysts for this reaction, sulfuric acid and hydrofluoric acid can be used. However, because of the ease by which it is used in the reaction, it is preferred to use sulfuric acid.

The acid strength of the acid catalyst must be above 90%. When using paraformaldehyde, the concentrated sulfuric acid must be used in amounts of at least two volumes of the acid per volume of the aromatic compound. If 37% aqueous formaldehyde is used, for example, the amount of sulfuric acid is double that used with the paraformaldehyde. Thus, with 37% aqueous formaldehyde (or methylal), it is necessary to use at least 4 volumes of concentrated sulfuric acid per volume of aromatic compound.

In this so-called cold process of preparing the micro-dispersed infusible resins, the reaction temperatures can range from 35° F. to 120° F. However, because of the beneficial effects obtained from the particle size of resins obtained thereby, it is preferred that the maximum temperature is 90° F.

Since this is an emulsion resinification process, it is necessary to use dispersants in the process. Such dispersants which can be used include various copolymer dispersing agents as exemplified by a copolymer of maleic anhydride and an alkyl methacrylate (e.g. lauryl methacrylate); a copolymer of an alkyl methacrylate (e.g. lauryl methacrylate), methacrylic acid, and a polyglycol methacrylate (e.g., polyethylene glycol) etc.; metal sulfonates as exemplified by calcium petroleum sulfonates, calcium alkyl benzene sulfonates (e.g. calcium dodecylbenzene sulfonate), etc.; polybutenyl succinic anhydride; low molecular weight cationic anionic detergents, such as partially dehydrated triamide reaction product of tetraethylene pentamine and branched chain octadecanoic acid; quaternary alkyl amines; alkyl esters of glycerine, etc.

The dispersants are used in amounts sufficient to emulsify the acid catalyst, e.g., sulfuric acid, in the solvent. These amounts, which vary with the particular dispersant used, can range from 0.1 to 1.0 vol. percent by weight of the sum of the vol. of the solvent and acid catalyst used.

For the successful formation of micro-dispersed infusible resins, it is necessary to form a solution of the aromatic compound in a solvent. Particularly effective solvents include chlorinated hydrocarbons, for example, carbon tetrachloride, trichloroethane, trichlorohexane, trichloroheptane, etc. When using sulfuric acid as the acid catalyst, the solvent minimizes the sulfonation of the aromatic compound, favoring the resin formation.

Although not intended to be bound thereby, it has been postulated that these infusible resins have the following structural formula:

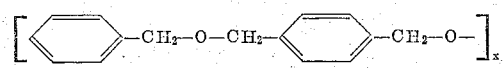

wherein $x$ is a number indicative of the molecular weight of these resins. Although this formula indicates a linear polymeric compound, these polymers are also cross-linked.

This postulated structure for these infusible resins is supported by infra-red analysis of the resin obtained. Infra-red analyses show the presence of ether linkages and highly substituted aromatic radicals.

In a typical preparation, an aromatic compound, sulfuric acid, a dispersant, and the solvent, are charged to a glass turbomixer at temperatures from 35° F. to 120° F., preferably a maximum temperature of 90° F. The whole mixture is then agitated vigorously, and a formaldehyde solution is added slowly at a rate sufficient to keep the reaction temperature below 90° F. with a cold water bath. The resulting slurry is then poured into cold alcohol and filtered. The precipitate which forms is then water-washed, washed with a dilute ammonium hydroxide, and finally with a solvent such as acetone, after which the product is dried.

The discrete micro-dispersed infusible resin particles described herein are less than 0.1 micron in diameter.

The following examples illustrate the preparation of various micro-dispersed infusible resins described herein.

*Example I.—Preparation of an infusible resin from benzene and formaldehyde*

A mixture of 640 ml. of carbon tetrachloride, 94 ml. (1.060) of benzene, 373 ml. of 98% sulfuric acid, and 8 ml. of a 25% concentrate of a dispersant [1] in carbon tetrachloride was blended in a 1500 ml. glass turbomixer. After the mixture had been thoroughly blended together, the mixture was cooled to 35° F. in an ice-salts bath after which 117 ml. (1.65 mols) of 38% aqueous formaldehyde was added dropwise with vigorous agitation for a period of about 1 hour. During this reaction time, the temperature rose to about 55° F. The resulting slurry was poured into cold acetone, filtered and washed several times with fresh acetone. The resulting product was a dark filter cake, which was placed in a beaker, mixed with fresh water, and to this was then added an 80% solution of ammonium hydroxide. The product turned bright yellow in color. The slurry was filtered, washed once with fresh water, twice with acetone, and twice with hexane. The final product was a light yellow powder.

*Example II.—Preparation of an infusible resin from benzene and formaldehyde*

A mixture of 41.4 grams (0.53 mol) benzene, 345 grams of 96% sulfuric acid, 1 gram of calcium petroleum sulfonate,[2] and 960 ml. of carbon tetrachloride were charged

[1] The dispersant was a copolymer of lauryl methacrylate and maleic anhydride having a molecular weight of about 100,000.
[2] The calcium petroleum sulfonate used was derived from a lubricating oil having a viscosity of 480 SSU at 100° F.

to a glass turbomixer at 70° F. The mixture was agitated vigorously, and 60 grams (0.76 mol) of 38% formaldehyde solution was added dropwise during a period of 40 minutes, keeping the reaction temperature below 90° F. with a cold water bath. The resulting thick reddish-black slurry was poured into cold methanol and filtered. The recovered precipitate was washed with water, dilute ammonium hydroxide, and finally with acetone.

As noted hereinabove, certain aromatic compounds are desired for the reaction with formaldehyde to produce the micro-dispersed infusible resin. Not all aromatic hydrocarbons will form such resins with formaldehyde.

A number of aromatic compounds did not form the infusible resins described herein, but, on the contrary, gave colored, solvent-soluble products. Examples of such aromatic compounds which were not operable are dodecyl benzene, mesitylene, durene, 1,2-dichlorol benzene, and 1,2-4-trichloro benzene. Still other aromatic compounds did not react at all with formaldehyde, which compounds include 1,4-dichloro benzene, 1,2,4,5-tetrachloro benzene, and nitrobenzene.

The micro-dispersed arene-formaldehyde infusible resins are light yellow, talc-like powders, which are stable up to about 700° F. in air. However, these compounds sinter and darken above these temperatures. These compounds are insoluble in all common organic and inorganic solvents, including fluorocarbons and boiling concentrated sulfuric acid. However, these resins char when treated with fuming sulfuric acid.

As noted hereinabove, the micro-dispersed infusible resins are used to thicken lubricating oils to form grease compositions. Not only are these compounds useful to form grease compositions, they are also useful for inks, creams, latex paints, varnishes, adhesives, etc.

The example hereinbelow illustrates the use of these resins as grease thickening agents.

*Example III.—Preparation of a grease from a resin obtained by reaction of benzene with formaldehyde*

A mixture of 114.5 grams of a California solvent refined naphthenic base oil having a viscosity of 450 SSU at 100° F. and 5.3 grams (0.019 equivalent) of stearic acid was heated to a temperature of 150° F. To this mixture was added 20 grams of the resin described in Example I hereinabove, followed by an aqueous slurry of 2.8 grams (0.076 equivalent) of calcium hydroxide in 20 ml. of water. The mixture was agitated vigorously and heated to a temperature of about 360° F., after which it was pan cooled, and passed through a Manton Gaulin homogenizer at 5,000 lbs. p.s.i. The resulting grease was a smooth, brown grease having an ASTM work penetration ($P_{60}$) of 285 and an ASTM dropping point in excess of 580° F.

As noted hereinabove, calcium hydroxide was used in the preparation of the grease composition. This is due to the fact that there is present a slight amount of surface acidity on the infusible resin, which acidity results from a catalyst used. Thus, it is desirable to incorporate a slight amount of base (e.g., calcium hydroxide) in the infusible resin thickened grease composition. However, the infusible resins do thicken lubricating oils to grease consistency in the absence of this base.

I claim:

1. A low temperature process for producing finely divided infusible resins having the characteristics of thickening agents for organic liquids, comprising adding, at temperatures less than 90° F., formaldehyde to a reaction mixture consisting of benzene having up to and including 2 alkyl radicals of up to and including 6 carbon atoms each, an oil soluble dispersant selected from the group consisting of methacrylate copolymers and metal petroleum sulfonates, a chlorinated hydrocarbon of up to and including 7 carbons which is a solvent for said aromatic hydrocarbon, and sulfuric acid, wherein the particle size of said resin is less than 0.1 micron.

2. A process according to claim 1 wherein the mole ratio of said benzene to said formaldehyde is in the range of from 0.5 to about 4.0.

3. A process according to claim 1 wherein said benzene compound is benzene.

4. A process according to claim 2 wherein said dispersant is calcium petroleum sulfonate.

5. A process according to claim 2 wherein said dispersant is a copolymer of alkyl methacrylate and maleic anhydride.

6. A composition consisting essentially of finely divided particles of an infusible resin having average diameters less than 0.1 micron obtained by the process of claim 2.

7. A composition consisting essentially of finely divided particles of an infusible resin having average diameters less than 0.1 micron obtained by the process of claim 3.

8. A composition consisting essentially of finely divided particles of an infusible resin having average diameters less than 0.1 micron obtained by the process of claim 4.

References Cited in the file of this patent

UNITED STATES PATENTS

| | | |
|---|---|---|
| 1,827,538 | Nastukoff | Oct. 13, 1931 |
| 2,568,313 | Woolhouse et al. | Sept. 18, 1951 |
| 2,713,571 | Gordon et al. | July 19, 1955 |

OTHER REFERENCES

Ellis: Chemistry of Synthetic Resins, vol. 1 (1935), pp. 211–214, Reinhold Publishing Corp., New York.

Calcott et al.: Jour. Amer. Chem. Soc., April 1939, pp. 949–951.